May 24, 1927.
D. G. DUTY
1,629,997
AIR BRAKE FOR MOTOR VEHICLES
Filed Oct. 23, 1924
2 Sheets-Sheet 2
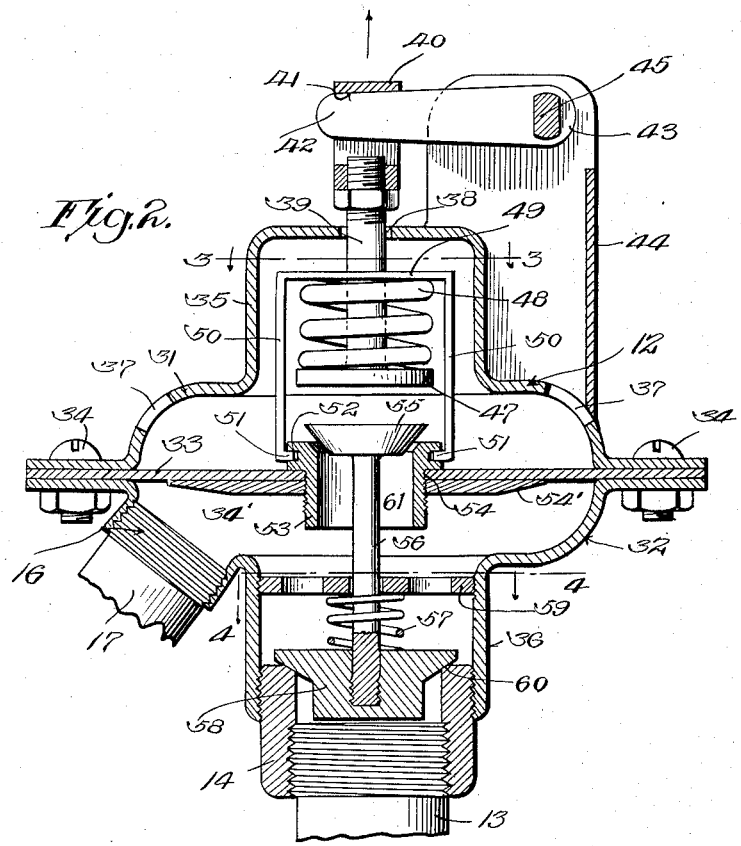
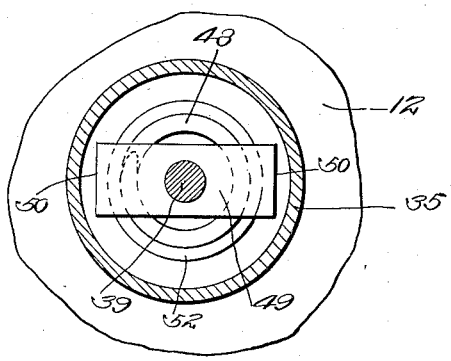
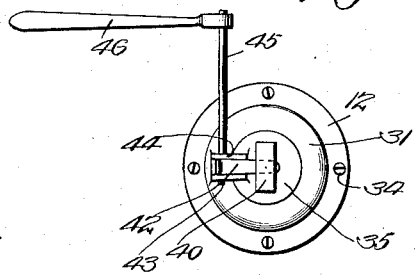
Inventor:
Dorsey G. Duty
By Percy H. Moore
Atty.

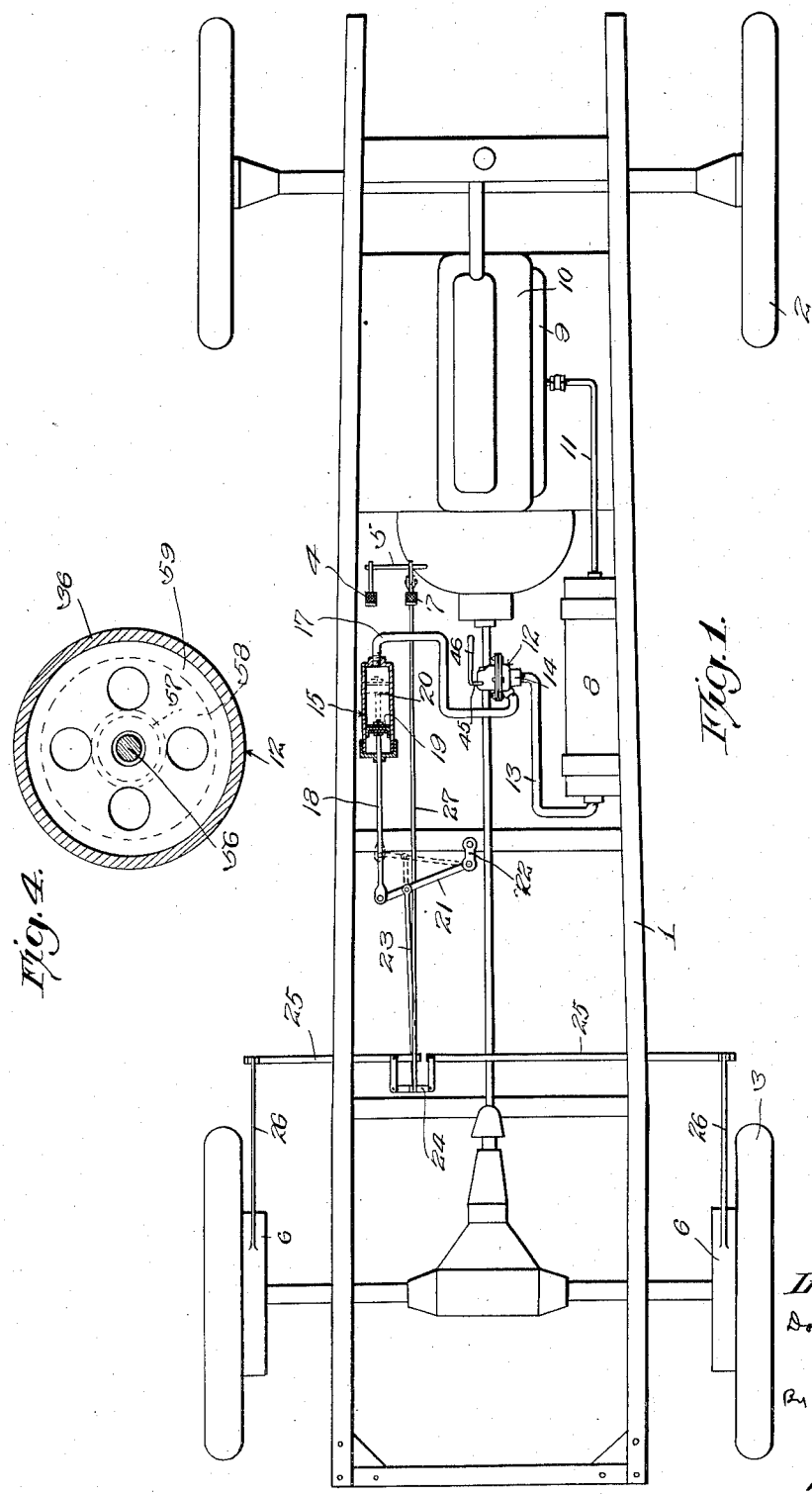

Patented May 24, 1927.

1,629,997

UNITED STATES PATENT OFFICE.

DORSEY G. DUTY, OF PENNSBORO, WEST VIRGINIA, ASSIGNOR TO THE DUTY AIR BRAKE COMPANY, OF JANE LEW, WEST VIRGINIA, A CORPORATION OF WEST VIRGINIA.

AIR BRAKE FOR MOTOR VEHICLES.

Application filed October 23, 1924. Serial No. 745,384.

My invention relates to vacuum operated brakes and mechanism for motor vehicles and the like, and has for its object to provide simple and easily actuated means for quickly applying the brakes without the use of the feet.

Another object of my invention is to provide means whereby on long grades the brakes can be constantly and uniformly applied.

Heretofore in the use of air brakes considerable difficulty has been encountered due to the fact that much moisture was admitted to the compressed air supply tank and valve housing and other parts of the brake operating mechanism, with the compressed air. This moisture would in time collect and freeze in very cold weather thus interfering with the successful operation of the brake mechanism. Difficulty has also been experienced due to the fact that on long grades the air supply for applying the brake would become exhausted unless the motor was kept running under power.

It is the object of my invention to overcome these objections.

In the accompanying drawings forming part of this specification:

Figure 1 is a plan view of a motor vehicle showing my invention applied thereto;

Figure 2 is a longitudinal section through the throttle valve housing;

Figure 3 is a section on the line 3—3 of Figure 2;

Figure 4 is a section on the line 4—4 of Figure 2, and

Figure 5 is a plan view showing the knee lever and its connection for applying the brakes.

Referring more particularly to the drawings wherein like reference numerals refer to corresponding parts throughout the several views, 1 denotes the frame of an automobile supported upon front and rear wheels 2 and 3 respectively. The clutch (not shown) is actuated in the usual way by means of foot pedal 4, fixedly mounted on the clutch shaft 5, while the brakes 6, are connected up with the foot pedal 7, loosely mounted on the shaft 5.

One end of a vacuum tank 8, suitably mounted on the frame 1, is connected with the manifold 9, of the engine 10, by means of pipe 11. It will thus be seen that a constant vacuum will be maintained in the tank 8, when the automobile is travelling with the clutch in, regardless of whether the engine is running under power. The opposite end of the vacuum tank to that just mentioned is connected to a vacuum control member 12, by means of the pipe 13, which threads into the coupling member 14, on the member 12.

A brake control cylinder 15, is connected to and communicates with an opening 16, in the vacuum control member 12, by means of the pipe 17. The piston rod 18, of the piston 19, of the cylinder 20, is pivotally connected to a rock arm 21, which in turn is pivotally connected to the frame 1, by a link 22. A rod 23, is connected at its forward end to the rock arm 21, intermediate the ends of the latter, and at its rear end is connected to the crank arm 24, of the usual brake rods 25 and 26 of the brake 6. It will thus be seen that forward movement of the rod 23, rocks the crank arm 24, and the rods 25, thus pulling the rods 26 forwardly and causing the brakes 6, to tighten.

This movement of the rod 23, and consequent application of the brake can be effected through the manipulation of the brake foot pedal 7, and the rod 27, which connects the pedal 7, with the crank 24, or this may be accomplished by creating a vacuum in the forward end of the cylinder 15, in a manner hereinafter explained.

The pressure control member 12, comprises two oppositely bowed castings 31 and 32 between the superposed edges of which is clamped by means of bolts 34, a diaphragm 33 separating the air chamber 34' into upper and lower air tight compartments. The castings 31 and 32 which form therebetween the air chamber 34', are provided with the oppositely disposed cylindrical portions or projections 35 and 36 respectively and the casting 31, is formed with a suction air inlet opening 37, for a purpose to be presently described.

The cylindrical portion 35, of the casting 31, is formed with an opening 38, through which projects the threaded end of a rod 39, and screw threadedly connected to the projecting end of this rod 39 is a head member 40. This member 40, is formed with an angular opening 41, for the reception of one end of an arm 42, the other end of which is fixed to a stub shaft 43, journaled in the support 44, carried by the casting 31. Secured to the angular end 45, of this shaft 43, and projecting at right angles thereto is a knee lever 46, by means of which the operator rotates the stub shaft 43 to pull the rod 39 outwardly through the opening 38, for a purpose to be presently described.

The opposite end of the rod 39, to that end to which the head 40 is attached is provided with an enlargement 47, which forms a seat or support for a coil spring 48. An apertured disk 49, slidably mounted on the rod 39, is formed with a plurality of depending arms 50, the ends of the arms being bent inwardly as at 51, to engage beneath the flange 52, of a tubular valve seat 53, threaded into the opening 54 of the diaphragm 33. A plate 54', threaded upon this valve seat 53, serves to support and strengthen the diaphragm.

A valve 55 formed on the inner end of the valve stem 56, is always in open position or out of contact with the valve seat 53 until the valve seat 52 is caused to move into seating engagement with the valve in a manner hereinafter described.

Mounted on the valve stem 56, is a coil spring 57, which bears at one end against a valve 58, detachably mounted on the outer end of the stem 56, and at its other end bears against an apertured plate 59, threaded into the cylindrical projection 36, thus normally holding the valve 58, against the beveled seat 60, formed on the coupling member 14.

When the operator wishes to apply the brakes to stop or slow down he either actuates the foot brake pedal or presses his knee against the knee lever 46, moving the latter to the right or in a clockwise direction about the axis of the shaft 43. This movement of the knee lever causes the arm 42, to pull the headed rod 39 outwardly through the opening 38, in the casting 31, in the direction of the arrow, Figure 2. As the rod 39 is moved outwardly, the arms 50 of the disk 49, exert a corresponding pull upon the tubular valve seat 53, moving the latter into engagement with the valve 55, thus shutting off communication between opposite sides of the chamber 34' through the central opening 61 in the diaphragm 33. As the outward movement of the rod 39, continues, valve 58 is lifted from its seat against the tension of coil spring 57. Opening of valve 58 creates a partial vacuum in the cylinder 15, thus causing the piston 19 to be drawn to the right, Figure 1 into dotted line position, by reason of the suction action thus created. This causes the brakes to be applied through rock arm 21, rod 23, crank arm 24 and brake rods 25 and 26.

The suction action of the engine may be briefly described as follows: Air is drawn into the vacuum tank 8 from the control member 12, via pipe 13, and thence past the valve 58 and out through pipe 17 to the cylinder 15, thus causing the piston 19, to be moved to the right Figure 1, and the brakes applied. When the operator releases the knee lever 46, the spring 57 will close the valve 58, the diaphragm will assume its normal horizontal position, out of contact with the valve 55 and fresh air will be drawn into the cylinder 15 through air opening 37, past valve 55 and through pipe 17, thus forcing the piston 19 to the left in Figure 1, releasing the brakes. When the brake lever is next actuated the charge of fresh air in the cylinder will be drawn into the manifold through the vacuum tank, and will form part of the explosive mixture.

It will be seen from the foregoing that fresh air is constantly replacing the vacuum in the cylinder 15 and vacuum tank 8 and that in consequence the danger of moisture collecting in these parts, where compressed air is the medium employed to actuate the brake cylinder piston.

Having thus described my invention what I claim as my invention is:

1. A control valve for braking systems of the class described composed of a casing divided by a diaphragm, one side of the casing being opened to the atmosphere and the other side with passages communicating with several units of the system, a valve seat upon one side of the diaphragm and in alignment with one of said passages, a valve stem passing through said seat and provided with a head for closing the same, a head upon the other end of the stem for closing the aligned passage within said casing, means connected to the valve seat for moving said diaphragm within said casing, and said diaphragm adapted during its movement to cause said valve to close the seat carried thereby and the aligned passage at different periods.

2. A control valve for braking systems of the class described comprising an air chamber, a diaphragm in said chamber, a valve seat in said air chamber on each side of said diaphragm, one of said seats being carried by the diaphragm, a valve stem having a valve on each end, one of said valves being normally in closed position against its seat and the other in open position out of contact with its seat, and means for actuating the diaphragm to first cause the valve seat carried thereby to engage against the first mentioned valve and then by a continued movement to cause the other of said valves to be opened.

In testimony whereof I affix my signature.

DORSEY G. DUTY.